US009451759B2

(12) United States Patent
Kuo (10) Patent No.: US 9,451,759 B2
(45) Date of Patent: Sep. 27, 2016

(54) LIQUID BUBBLE SEPARATOR OF CIRCULATING WATER SYSTEM

(71) Applicant: Chi-Tse Kuo, Taichung (TW)

(72) Inventor: Chi-Tse Kuo, Taichung (TW)

( * ) Notice: Subject to any disclaimer, the term of this patent is extended or adjusted under 35 U.S.C. 154(b) by 156 days.

(21) Appl. No.: 14/524,112

(22) Filed: Oct. 27, 2014

(65) Prior Publication Data

US 2016/0113249 A1    Apr. 28, 2016

(51) Int. Cl.
| A01K 63/04 | (2006.01) |
| C02F 1/24 | (2006.01) |
| C02F 1/78 | (2006.01) |
| C02F 3/02 | (2006.01) |
| C02F 103/22 | (2006.01) |

(52) U.S. Cl.
CPC ................. *A01K 63/04* (2013.01); *C02F 1/24* (2013.01); *C02F 1/78* (2013.01); *C02F 3/02* (2013.01); *C02F 2103/22* (2013.01); *C02F 2201/002* (2013.01); *C02F 2303/04* (2013.01)

(58) Field of Classification Search
CPC ........... A01K 63/04; C02F 1/24; C02F 1/78; C02F 3/02; C02F 2201/002; C02F 2303/04; C02F 2103/22
USPC ......... 210/167.26, 198.1, 760, 905; 119/261, 119/263
See application file for complete search history.

(56) References Cited

U.S. PATENT DOCUMENTS 5,282,962 A * 2/1994 Chen .................... A01K 63/045
119/259
5,562,821 A * 10/1996 Gutierrez-Collazo . A01K 63/04
119/263
5,665,227 A * 9/1997 Watt ........................ A01K 63/04
210/167.26
6,156,209 A * 12/2000 Kim ........................ A01K 63/04
119/263
2009/0200242 A1* 8/2009 Newman .............. A01K 63/045
210/703
2010/0170450 A1* 7/2010 Bradley ................. A01K 63/04
119/204
2014/0070429 A1* 3/2014 Lee ......................... A01K 63/04
261/6
2014/0190896 A1* 7/2014 Dickson ................ C02F 1/5236
210/703
2015/0373954 A1* 12/2015 Kuo ........................ A01K 63/04
210/151

FOREIGN PATENT DOCUMENTS

DE    10 2004 062519 A1 *  7/2006

* cited by examiner

*Primary Examiner* — Fred Prince (57) ABSTRACT

A liquid bubble separator of a circulating water system contains: a cylindrical tank, a pump, a bubble collection tank, and at least one micro bubble generating unit. The cylindrical tank included a water chamber defined by an inner wall, an inlet pipe, an outlet pipe, at least one air orifice, and a bubble discharging hole. The pump is coupled with the inlet pipe to pump treated water into the inlet pipe via the nitrification tank. The bubble collection tank is mounted on one side of the cylindrical tank and includes a collecting tube. Each micro bubble generating unit is disposed in the water chamber and includes a body, a first mixing room, an inlet, at least one air tube coupling with the at least one air orifice and corresponding to the inlet, and a plurality of backflow apertures formed around the body and communicating with the first mixing room.

14 Claims, 6 Drawing Sheets

LIQUID BUBBLE SEPARATOR OF CIRCULATING WATER SYSTEM

FIELD OF THE INVENTION

The present invention relates to water treatment equipment, and more particularly to a liquid bubble separator of a circulating water system which eliminates protein in aquaculture water to enhance an aquaculture survival rate and a quantity of the aquaculture water.

BACKGROUND OF THE INVENTION

A conventional circulating water system for aquaculture is disclosed in TW Filing No. 101496697 and contains: at least one aquaculture tank, an aeration unit, a sterilization unit, at least one water circulating tank, a plurality of membrane filtering units, a water returning unit, and a spraying unit. The aeration unit aerates airs to aquaculture water in aquaculture tank, such that the aquaculture tank is full of dissolved oxygen, and baits and excrements overflow out of the aquaculture tank, thereafter the sterilization unit supplies ozone, and an antibacterial layer is mounted in the aquaculture tank to prevent breeding viruses and bacteria, thus increasing aquaculture density and survival rate.

However, fishes secret and discharge mucus, and the mucus attaches with the baits and the excrements having protein and a part thereof is discharged out of the aquaculture tank and is decomposed to ammonia, thereafter the ammonia is eliminated by nitrosomonas after nitrification. But most part of the mucus is pumped toward a filtering room of each membrane filtering unit and attaches on a filtration film to block an opening of the filtration film, thus producing circulating water decreasingly. Even though the spraying unit cleans the filtration film, the mucus cannot be removed from the filtration film easily.

In addition, the baits, the excrements and solid substances cannot overflow the aquaculture tank completely, so bubbles flow on the aquaculture water to form an organic waste layer, and then the organic waste layer is decomposed to the ammonia in the aquaculture tank. The filtration film is an ultra-filtration (UF) film, but the UF film cannot filter the ammonia effectively, in other words, the aquaculture tank remains the ammonia at high density, thereby decreasing the survival rate.

The present invention has arisen to mitigate and/or obviate the afore-described disadvantages.

SUMMARY OF THE INVENTION

The primary object of the present invention is to provide a liquid bubble separator of a circulating water system which is fixed on one side of a membrane filtration unit to eliminate mucus and suspended substances in liquids, before filtering aquaculture water, thus avoiding a blockage of the membrane filtration unit and enhancing an aquaculture survival rate and a service life of the membrane filtration unit.

Another object of the present invention is to provide a liquid bubble separator of a circulating water system which is mounted beside one side of an aquaculture tank to separate solids in the aquaculture water, thus enhancing a quantity of the aquaculture water.

To obtain the above objects, a liquid bubble separator of a circulating water system provided by the present invention, wherein the circulating water system overflows aquaculture water in an aquaculture tank toward a nitrification tank with nitrosomonas to cause nitrification, and a membrane filtration unit separates solids in the aquaculture water, thereafter the aquaculture water is pumped back to the aquaculture tank so as to recycle the aquaculture water.

The liquid bubble separator is fixed on one side of the membrane filtration unit and contains: a cylindrical tank, a pump, a bubble collection tank, and at least one micro bubble generating unit.

The cylindrical tank includes a water chamber defined by an inner wall, an inlet pipe and an outlet pipe which are inserted into the water chamber, at least one air orifice, and a bubble discharging hole.

The pump is coupled with the inlet pipe to pump treated water into the inlet pipe of the cylindrical tank via the nitrification tank.

The bubble collection tank is mounted on one side of the cylindrical tank and includes a collecting tube joined with the bubble discharging hole.

Each micro bubble generating unit is disposed in the water chamber of the cylindrical tank and includes a body, a first mixing room formed in the body, an inlet connecting with the inlet pipe and communicating with the first mixing room, at least one air tube coupling with the at least one air orifice and corresponding to the inlet, and a plurality of backflow apertures formed around a peripheral side of the body and communicating with the first mixing room, such that when liquids are pumped into the first mixing room via the inlet, air is guided from one of the at least one air tube and is mixed with the liquids in the first mixing room to generate mixed liquids with micro bubbles, and the mixed liquids overflow to the water chamber of the cylindrical tank from the plurality of backflow apertures so that mucus, baits, excrements, suspended substances in the mixed liquids gather on the micro bubbles and are pushed upwardly, and then they flow to the bubble collection tank through the collecting tube, the mixed liquids separate from the micro bubbles and flow downwardly into the aquaculture tank via the outlet pipe of the cylindrical tank.

DETAILED DESCRIPTION OF THE PREFERRED EMBODIMENTS

Figure 1:
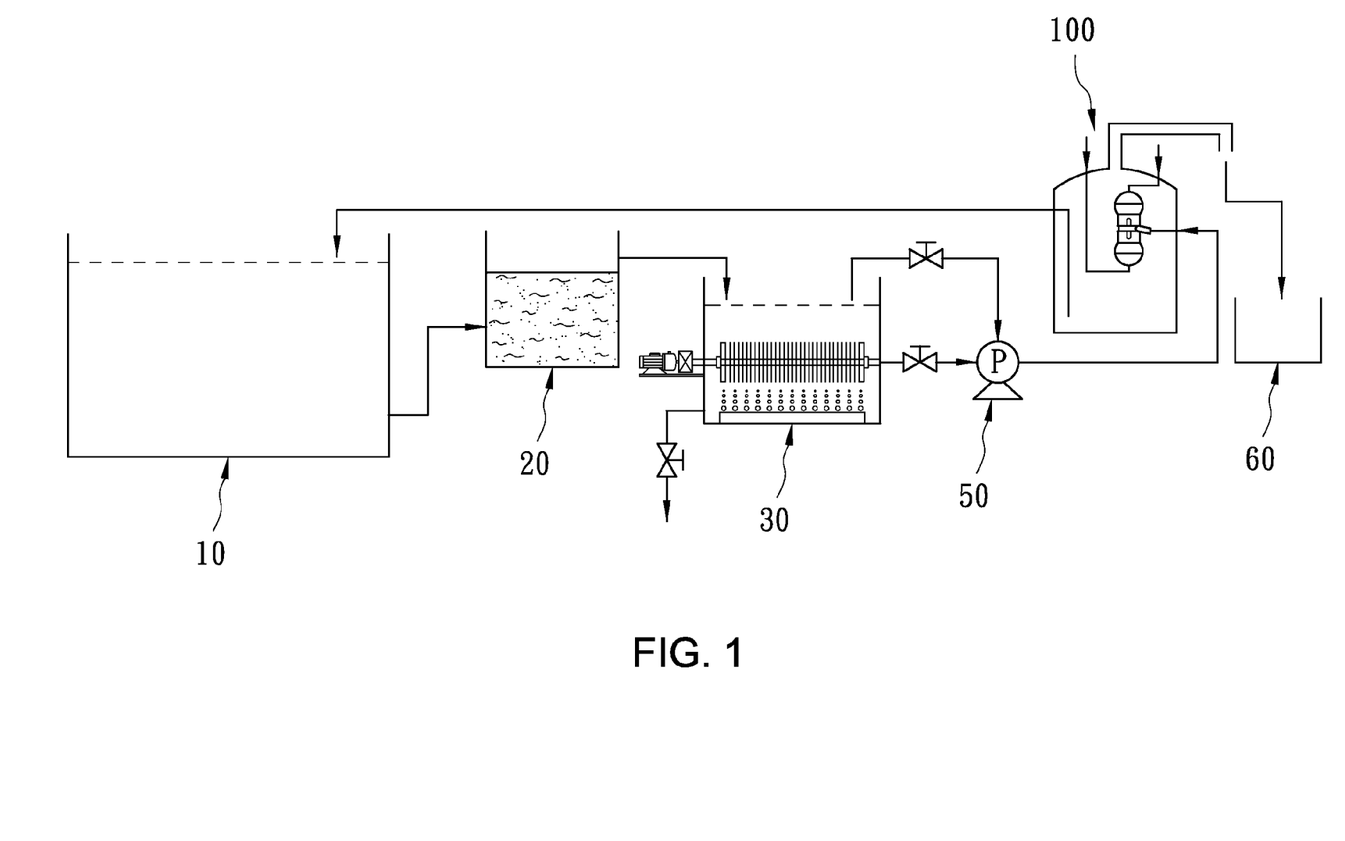
FIG. 1 is a diagram showing the assembly of a circulating water system according to a first embodiment of the present invention.

With reference to FIG. 1, a circulating water system according to a first embodiment of the present invention overflows aquaculture water in an aquaculture tank 10 toward a nitrification tank 20 with nitrosomonas to cause nitrification, and a membrane filtration unit 30 separates solids in the aquaculture water, thereafter the aquaculture water is pumped back to the aquaculture tank 10, thus recycling the aquaculture water. A liquid bubble separator 100 is fixed on one side of the membrane filtration unit 30.

Figure 2:
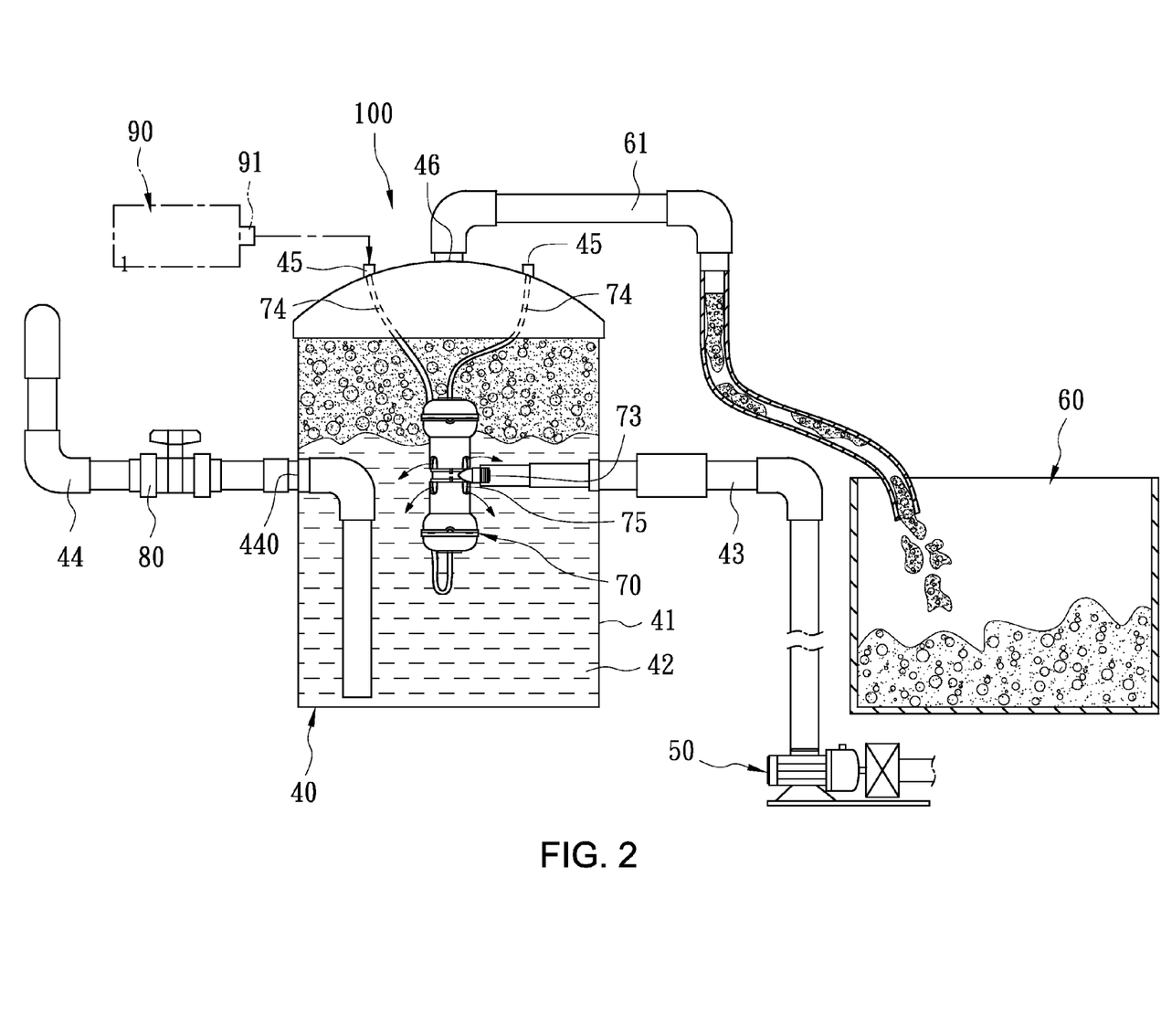
FIG. 2 is a cross sectional showing the assembly of a liquid bubble separator of the circulating water system according to the first embodiment of the present invention.

Referring to FIG. 2, the liquid bubble separator 100 includes a cylindrical tank 40, a pump 50, a bubble collection tank 60, and at least one micro bubble generating unit 70.

The cylindrical tank 40 includes a water chamber 42 defined by an inner wall 41, an inlet pipe 43 inserted into the water chamber 42, an outlet pipe 44 connected with an outlet 440 and inserted into the water chamber 42, two air orifices 45 defined on a top end thereof, and a bubble discharging hole 46 formed on the top end thereof. A height of the outlet pipe 44 is lower than that of the bubble discharging hole 46, such that bubbles in the cylindrical tank 40 are pushed upwardly and discharged easily.

The pump 50 is coupled with the inlet pipe 43 to pump treated water into the inlet pipe 43 of the cylindrical tank 40 via the nitrification tank 20 or the membrane filtration unit 30.

The bubble collection tank 60 is mounted on one side of the cylindrical tank 40 and includes a collecting tube 61 joined with the bubble discharging hole 46.

Figure 3:
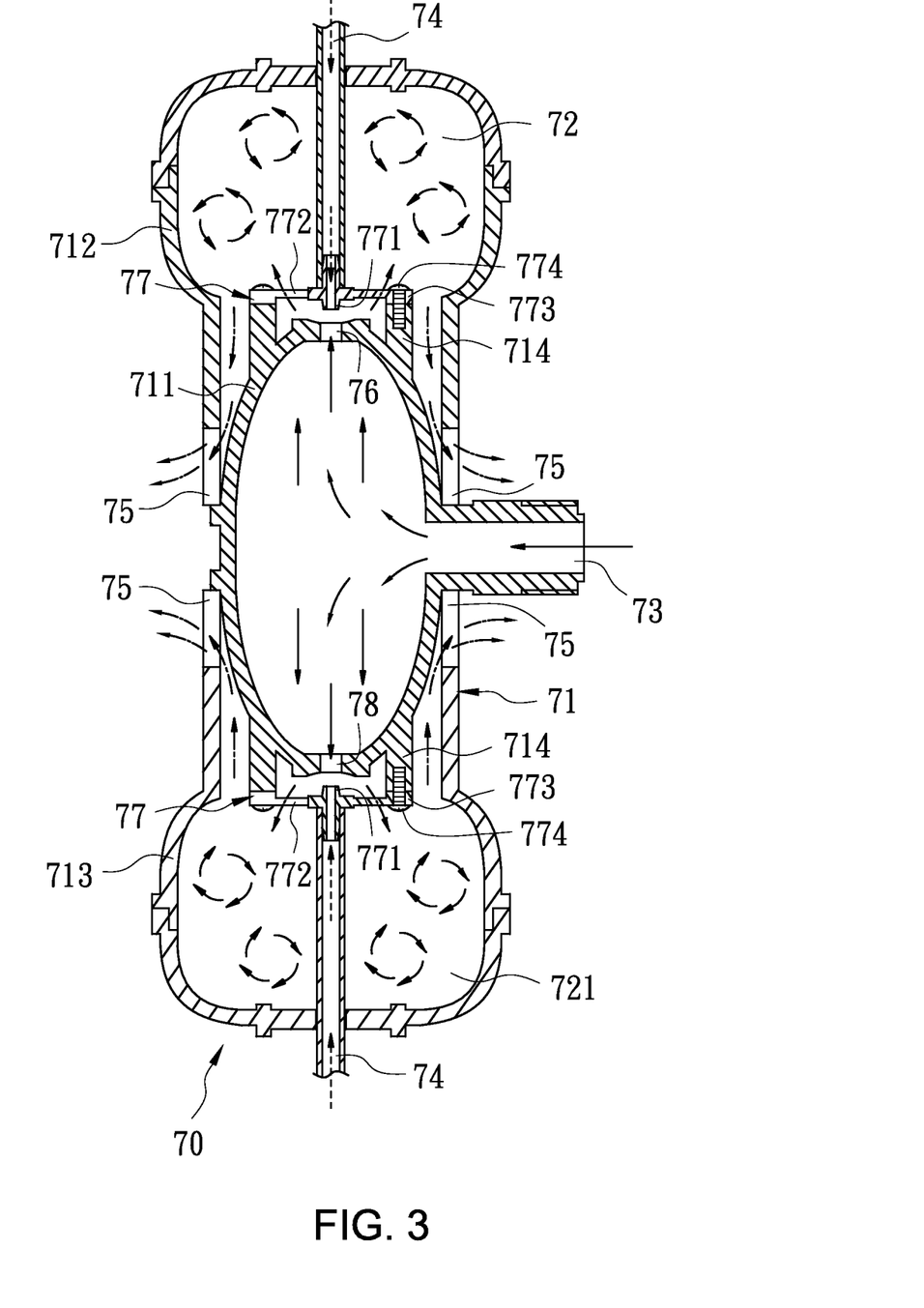
FIG. 3 is a cross sectional view showing the assembly of a micro bubble generating unit of the liquid bubble separator according to the first embodiment of the present invention.

As shown in FIG. 3, each micro bubble generating unit 70 is disposed in the water chamber 42 of the cylindrical tank 40 and includes a body 71, a first mixing room 72 formed in the body 71, an inlet 73 connecting with the inlet pipe 43 and communicating with the first mixing room 72, two air tubes 74 coupling with the two air orifices 45 and corresponding to the inlet 73, and a plurality of backflow apertures 75 formed around a peripheral side of the body 71 and communicating with the first mixing room 72.

The body 71 of each micro bubble generating unit 70 has a hollowly inner housing 711 and a first outer housing 712 between which is defined the first mixing room 72, and the inner housing 711 has the inlet 73 defined on one side thereof and has a first spout 76 formed on a first end thereof to spray the treated water toward the first mixing room 72 and corresponding to one of the two air tubes 74, such that when the treated water is sprayed to the first mixing room 72 from the first spout 76, it causes a vacuum suction to the one of the two air tubes 74 to pump outside air (Venturi effect), thus generating micro bubbles quickly.

Each micro bubble generating unit 70 further includes a fixing mount 77 fixed above the first spout 76 of the inner housing 711, and the fixing mount 77 has a nozzle 771 corresponding to the first spout 76, plural ribs 772 radially extending outwardly from an outer peripheral side of the nozzle 771, and a plurality of locking portions 773 connecting with distal ends of the plural ribs 772, wherein plural connecting seats 714 are arranged around an outer peripheral side of the first spout 76, and the plurality of locking portions 773 of the fixing mount 77 are locked on the plural connecting seats 714 by cooperating with plural lockers 774.

The body 71 also has a second outer housing 713 covered on a second end of the inner casing 711 opposite to the first end of the inner casing 711, and between the inner housing 711 and the second outer housing 713 is defined a second mixing room 721, the inlet 73 is formed on the one side of the inner housing 711, the inner housing 711 also has a second spout 78 defined on the second end thereof to spray the treated water toward the second mixing room 721 and corresponding to the other of the two air tubes 74.

As illustrated in FIGS. 2 and 3, when liquids are pumped into the first mixing room 72 via the inlet 73, air is guided into the fixing mount 77 from the one of the two air tubes 74 and is sprayed out of the nozzle 771. In the meantime, the liquids and the air are mixed in the first mixing room 72 and the second mixing room 721 to generate mixed liquids with micro bubbles, and the mixed liquids overflow to the water chamber 42 of the cylindrical tank 40 from the plurality of backflow apertures 75 so that mucus, baits, excrements, suspended substances in the mixed liquids gather on the micro bubbles and are pushed upwardly, and then they flow to the bubble collection tank 60 through the collecting tube 61, wherein the mixed liquids separate from the micro bubbles and flow downwardly into the membrane filtration unit 30 via the outlet pipe 44 of the cylindrical tank 40.

Figure 4:
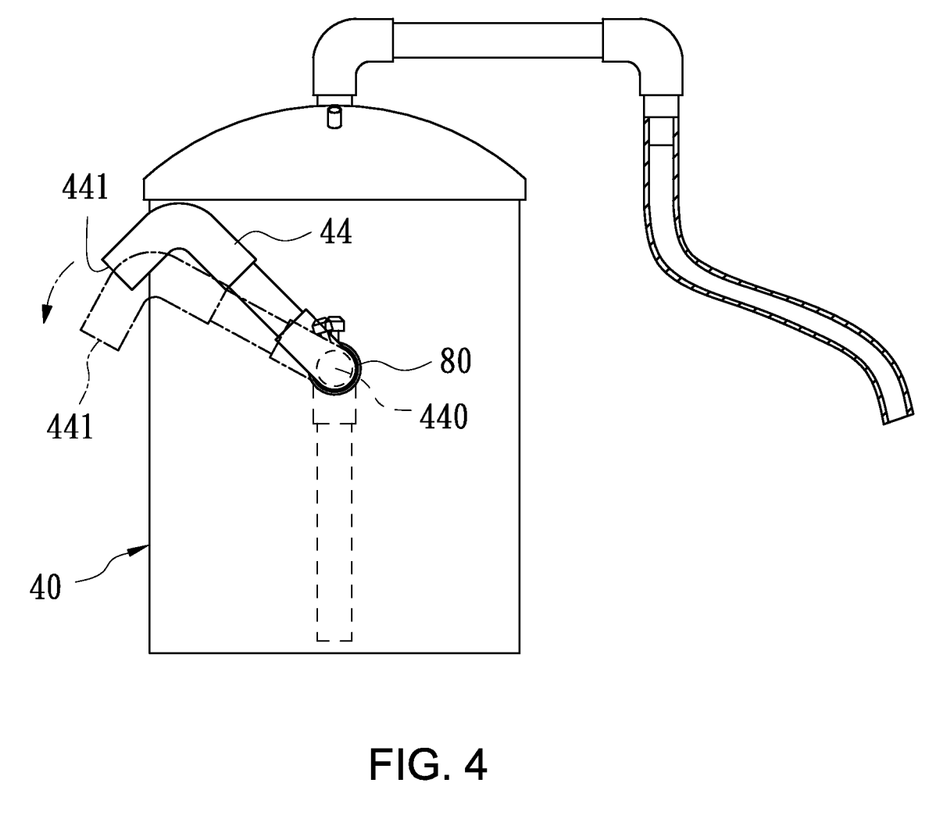
FIG. 4 is a cross sectional showing a height of an outlet pipe of a cylindrical tank being adjusted according to the first embodiment of the present invention.

With reference to FIG. 4, the liquid bubble separator 100 further includes a fitting tube 80 fitted with the outlet pipe 44 which is formed in an inverted L shape, and a height of an outflow end 441 of the outlet pipe 44 relative to the outlet 440 is changed by adjusting the fitting tube 80, wherein the outlet pipe 44 is illustrated by an imaginary line, and when a pressure and a water level in the cylindrical tank 40 are lowered, a pushing speed of the micro bubbles decelerates by which the micro bubbles contact with the mixed liquids in a long time so that the liquid bubble separator 100 eliminates organics efficiently. Thereby, the height of the outflow end 441 of the outlet pipe 44 is adjusted to change the pressure and the water level in the cylindrical tank 40 and to control the pushing speed of the micro bubbles, thus discharging the micro bubbles out of the cylindrical tank 40 and separating the mixed liquids from the micro bubbles quickly.

Referring to FIG. 2, the liquid bubble separator 100 further includes an ozone generating unit 90 mounted outside the cylindrical tank 40 and having an ozone exit 91 which corresponds to one of the two air orifices 45, such that ozone ($O_3$) is fed into the water chamber 42 to sterilize bacteria.

Figure 5:
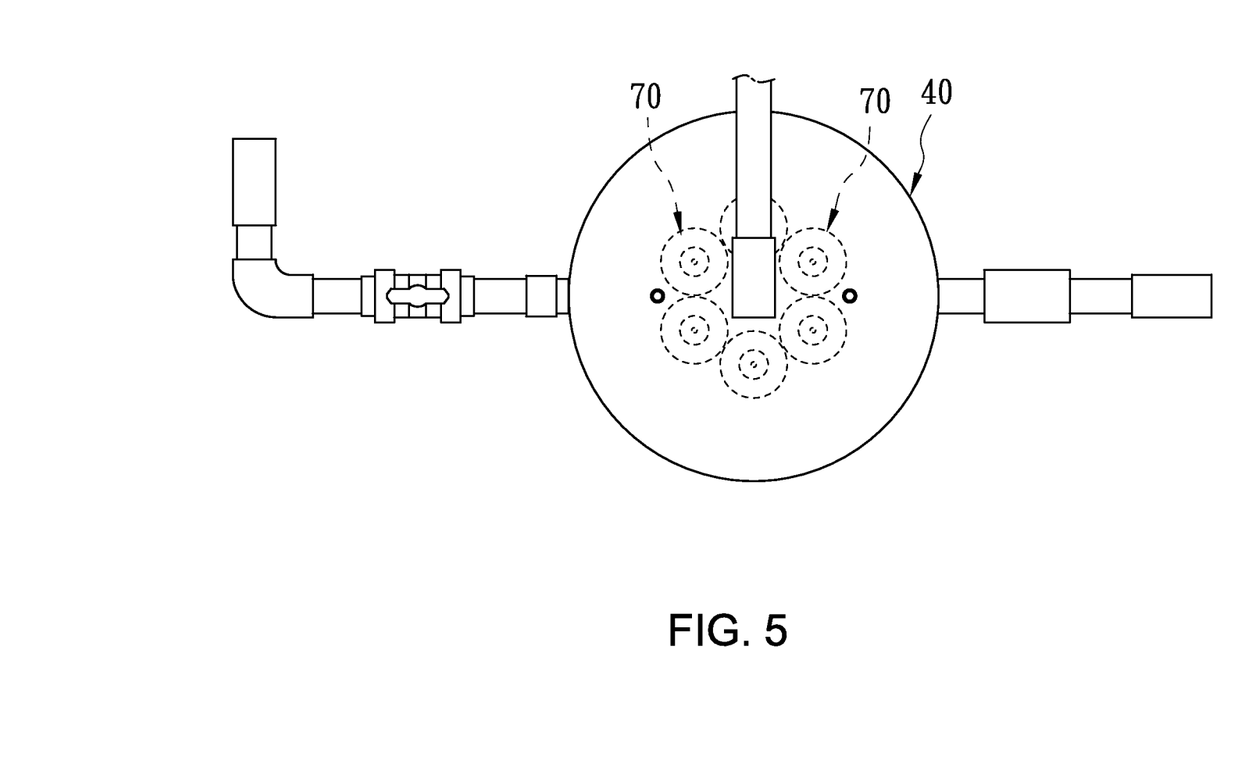
FIG. 5 is a top plan view showing plural micro bubble generating units being arranged in the cylindrical tank according to the first embodiment of the present invention.

As shown in FIG. 5, plural micro bubble generating units 70 are arranged in the cylindrical tank 40 to separate ammonia based on using requirement.

Figure 6:
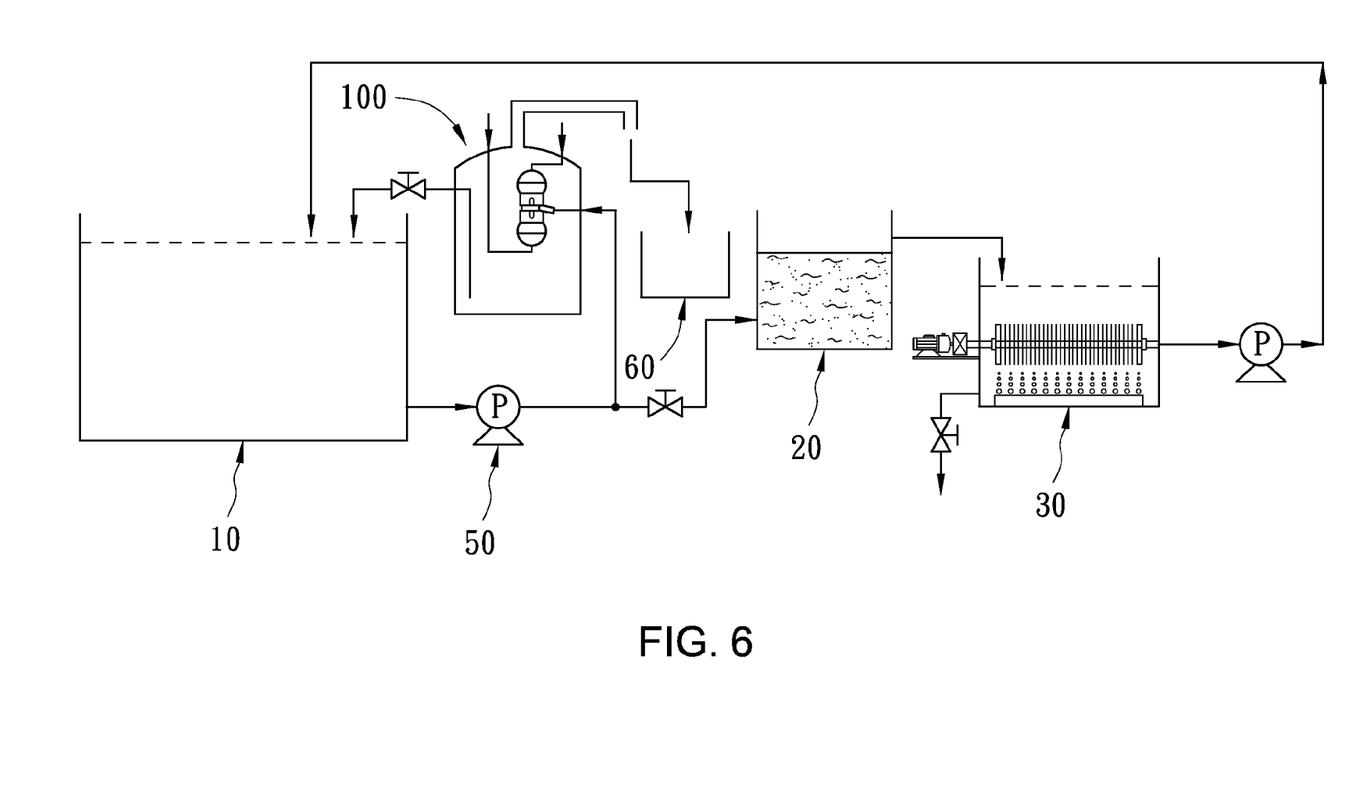
FIG. 6 is a diagram showing the assembly of a circulating water system according to a second embodiment of the present invention.

With reference to FIG. 6, a liquid bubble separator 100 according to a second embodiment of the present invention is mounted beside one side of an aquaculture tank 10 to remove bubbles and mucus in aquaculture water, and after separating the bubbles in the aquaculture water, the aquaculture water overflows toward a nitrification tank 20 with nitrosomonas to cause nitrification, then a membrane filtration unit 30 separates solids in the aquaculture water. Preferably, the liquid bubble separator 100 is mounted beside one side of the aquaculture tank 10, and the mucus in the aquaculture water is removed before nitrification or membrane filtration to avoid blocking an opening of the membrane filtration unit 30. Since a structure of the liquid bubble separator 100 is identical to that of the first embodiment, further remarks are omitted.

Accordingly, the liquid bubble separator 100 mixes the liquids and the air together and separates the mixed liquids from the micro bubbles so that mucus, baits, excrements, suspended substances in the mixed liquids are discharged into the bubble collection tank 60, and when the micro bubbles float upwardly, the mixed liquids flow back to the aquaculture tank 10 or the membrane filtration unit 30, hence the mucus and the ammonia in the mixed liquids are removed to recycle the aquaculture water. Furthermore, the liquid bubble separator 100 is mounted beside the one side of the aquaculture tank 10 to avoid blocking the opening of the membrane filtration unit 30.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A liquid bubble separator of a circulating water system, a circulating water system overflowing aquaculture water in an aquaculture tank toward a nitrification tank with nitrosomonas to cause nitrification, and a membrane filtration unit separating solids in the aquaculture water, thereafter the aquaculture water being pumped back to the aquaculture tank so as to recycle the aquaculture water, the liquid bubble separator being fixed on one side of the membrane filtration unit and comprising:

a cylindrical tank including a water chamber defined by an inner wall, an inlet pipe and an outlet pipe which are inserted into the water chamber, at least one air orifice, and a bubble discharging hole;

a pump coupled with the inlet pipe to pump treated water into the inlet pipe of the cylindrical tank via the nitrification tank;

a bubble collection tank mounted on one side of the cylindrical tank and including a collecting tube joined with the bubble discharging hole;

at least one micro bubble generating unit disposed in the water chamber of the cylindrical tank, and each of the at least one micro bubble generating unit including a body, a first mixing room formed in the body, an inlet connecting with the inlet pipe and communicating with the first mixing room, at least one air tube coupling with the at least one air orifice and corresponding to the inlet, and a plurality of backflow apertures formed around a peripheral side of the body and communicating with the first mixing room, such that when liquids are pumped into the first mixing room via the inlet, air is guided from one of the at least one air tube and is mixed with the liquids in the first mixing room to generate mixed liquids with micro bubbles, and the mixed liquids overflow to the water chamber of the cylindrical tank from the plurality of backflow apertures so that mucus, baits, excrements, suspended substances in the mixed liquids gather on the micro bubbles and are pushed upwardly, and then they flow to the bubble collection tank through the collecting tube, the mixed liquids separate from the micro bubbles and flow downwardly into the aquaculture tank via the outlet pipe of the cylindrical tank.

2. The liquid bubble separator of the circulating water system as claimed in claim 1, wherein the body of each micro bubble generating unit has a hollowly inner housing and a first outer housing between which is defined the first mixing room, and the inner housing has the inlet defined on one side thereof and has a first spout formed on a first end thereof to spray the treated water toward the first mixing room and corresponding to the one of the at least one air tube.

3. The liquid bubble separator of the circulating water system as claimed in claim 2, further comprising a fixing mount fixed above the first spout of the inner housing, and the fixing mount having a nozzle corresponding to the first spout, plural ribs radially extending outwardly from an outer peripheral side of the nozzle, and a plurality of locking portions connecting with distal ends of the plural ribs, wherein plural connecting seats are arranged around an outer peripheral side of the first spout, and the plurality of locking portions of the fixing mount are locked on the plural connecting seats.

4. The liquid bubble separator of the circulating water system as claimed in claim 2, wherein the body also has a second outer housing covered on a second end of the inner casing opposite to the first end of the inner casing, and between the inner housing and the second outer housing is defined a second mixing room, the inlet is formed on the one side of the inner housing, the inner housing also has a second spout defined on the second end thereof to spray the treated water toward the second mixing room and corresponding to the other of the at least one air tube.

5. The liquid bubble separator of the circulating water system as claimed in claim 1, further comprising a fitting tube fitted with the outlet pipe of the cylindrical tank, and the outlet pipe is formed in an inverted L shape, a height of an outflow end of the outlet pipe relative to the outlet is changed by adjusting the fitting tube.

6. The liquid bubble separator of the circulating water system as claimed in claim 1, wherein a height of the outlet pipe is lower than that of the bubble discharging hole.

7. The liquid bubble separator of the circulating water system as claimed in claim 1, further comprising an ozone generating unit mounted outside the cylindrical tank and having an ozone exit which corresponds to one of the at least one air orifice, such that ozone is fed into the water chamber to sterilize bacteria.

8. A liquid bubble separator of a circulating water system being applied to treat aquaculture water in an aquaculture tank and being mounted beside one side of the aquaculture tank to remove bubbles and mucus in the aquaculture water, and after separating the bubbles in the aquaculture water, the aquaculture water overflowing toward a nitrification tank with nitrosomonas to cause nitrification, then a membrane filtration unit separating solids in the aquaculture water, the liquid bubble separator comprising:

a cylindrical tank including a water chamber defined by an inner wall, an inlet pipe and an outlet pipe which are inserted into the water chamber, at least one air orifice, and a bubble discharging hole;

a pump coupled with the inlet pipe to pump treated water into the inlet pipe of the cylindrical tank via the nitrification tank;

a bubble collection tank mounted on one side of the cylindrical tank and including a collecting tube joined with the bubble discharging hole;

at least one micro bubble generating unit disposed in the water chamber of the cylindrical tank, and each of the at least one micro bubble generating unit including a body, a first mixing room formed in the body, an inlet connecting with the inlet pipe and communicating with the first mixing room, at least one air tube coupling with the at least one air orifice and corresponding to the inlet, and a plurality of backflow apertures formed around a peripheral side of the body and communicating with the first mixing room, such that when liquids are pumped into the first mixing room via the inlet, air is guided from one of the at least one air tube and is mixed with the liquids in the first mixing room to generate mixed liquids with micro bubbles, and the mixed liquids overflow to the water chamber of the cylindrical tank from the plurality of backflow apertures so that mucus, baits, excrements, suspended substances in the mixed liquids gather on the micro bubbles and are pushed upwardly, and then they flow to the bubble collection tank through the collecting tube, the mixed liquids separate from the micro bubbles and flow downwardly into the aquaculture tank via the outlet pipe of the cylindrical tank.

9. The liquid bubble separator of the circulating water system as claimed in claim 8, wherein the body of each micro bubble generating unit has a hollowly inner housing and a first outer housing between which is defined the first mixing room, and the inner housing has the inlet defined on one side thereof and has a first spout formed on a first end thereof to spray the treated water toward the first mixing room and corresponding to the one of the at least one air tube.

10. The liquid bubble separator of the circulating water system as claimed in claim 9, further comprising a fixing mount fixed above the first spout of the inner housing, and the fixing mount having a nozzle corresponding to the first spout, plural ribs radially extending outwardly from an outer peripheral side of the nozzle, and a plurality of locking portions connecting with distal ends of the plural ribs, wherein plural connecting seats are arranged around an outer peripheral side of the first spout, and the plurality of locking portions of the fixing mount are locked on the plural connecting seats.

11. The liquid bubble separator of the circulating water system as claimed in claim 9, wherein the body also has a second outer housing covered on a second end of the inner casing opposite to the first end of the inner casing, and between the inner housing and the second outer housing is defined a second mixing room, the inlet is formed on the one side of the inner housing, the inner housing also has a second spout defined on the second end thereof to spray the treated water toward the second mixing room and corresponding to the other of the at least one air tube.

12. The liquid bubble separator of the circulating water system as claimed in claim 8, further comprising a fitting tube fitted with the outlet pipe of the cylindrical tank, and the outlet pipe is formed in an inverted L shape, a height of an outflow end of the outlet pipe relative to the outlet is changed by adjusting the fitting tube.

13. The liquid bubble separator of the circulating water system as claimed in claim 8, wherein a height of the outlet pipe is lower than that of the bubble discharging hole.

14. The liquid bubble separator of the circulating water system as claimed in claim 8, further comprising an ozone generating unit mounted outside the cylindrical tank and having an ozone exit which corresponds to one of the at least one air orifice, such that ozone is fed into the water chamber to sterilize bacteria.

* * * * *